United States Patent [19]
Lee et al.

[11] Patent Number: 6,154,127
[45] Date of Patent: Nov. 28, 2000

[54] LEFT/RIGHT TURN, FAILURE/OVERTAKING VEHICLE SIGNAL LIGHT CONTROL SYSTEM

[76] Inventors: Chiu-Shan Lee; S. S. Chen Li, both of No. 31, Lane 18, Chang-Chun Rd., Hsintien City, Taipei County, Taiwan

[21] Appl. No.: 09/274,298

[22] Filed: Mar. 23, 1999

[51] Int. Cl.$^7$ ...................................................... B60Q 1/34
[52] U.S. Cl. ........................ 340/475; 340/431; 340/468; 340/479; 307/10.8; 315/77
[58] Field of Search .................... 340/475, 479, 340/468, 431; 307/10.8; 315/77

[56] References Cited

U.S. PATENT DOCUMENTS

| | | | |
|---|---|---|---|
| 4,380,753 | 4/1983 | Gant | 340/475 |
| 5,585,784 | 12/1996 | Pabla et al. | 340/475 |

Primary Examiner—Daryl Pope
Attorney, Agent, or Firm—Rosenberg, Klein & Lee

[57] ABSTRACT

A left/right turn, failure/overtaking vehicle signal light control system, which includes a holder frame, an actuating device pivoted to the holder frame and driven by a lever, two signal lights, first switch means controlled by the actuating device to flash one of the signal lights for left or right turn indication, second switch means controlled to flash the signal lights for failure/overtaking indication, and third switch means connected between the second switch means and the signal lights, wherein the actuating device is moved between a first position where the actuating device is maintained in contact with the third switch means, enabling the signal lights to be flashed for failure/overtaking indication when the second switch means is witched on, and a second position where the actuating device is disconnected from the third switch means, and the first switch means is driven by the actuating device to flash one of the signal lights for left or right turn indication.

1 Claim, 4 Drawing Sheets

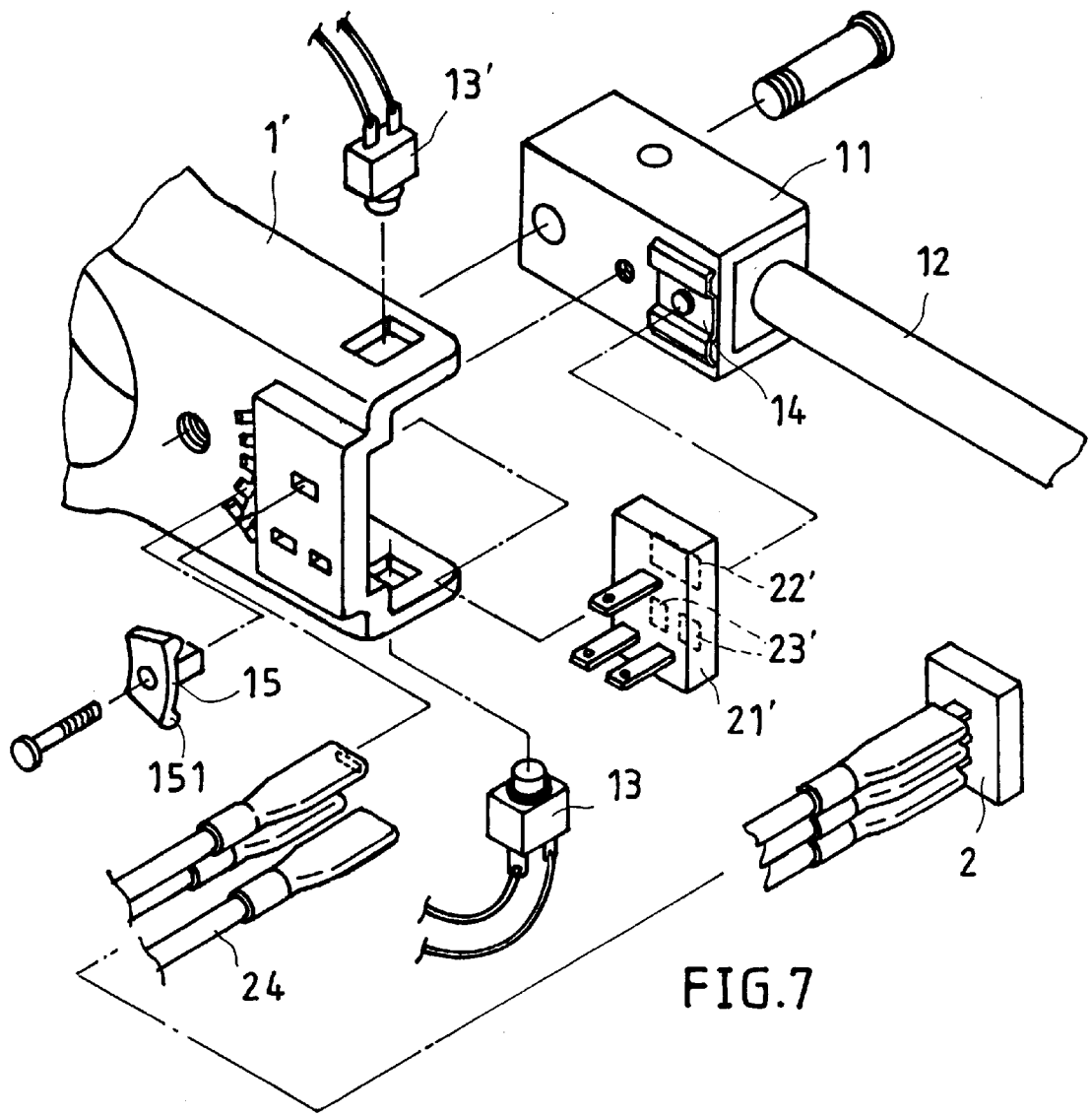
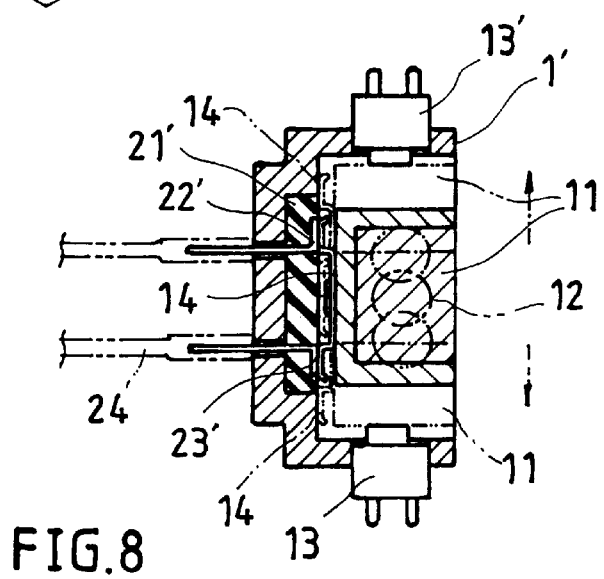

LEFT/RIGHT TURN, FAILURE/OVERTAKING VEHICLE SIGNAL LIGHT CONTROL SYSTEM

BACKGROUND OF THE INVENTION

The present invention relates to a left/right turn, failure/overtaking vehicle signal light control system in which the failure/overtaking signal light control switch is automatically switched off when the left turn or right turn signal light control switch is switched on to flash one signal light for left turn or right turn indication.

In a motor vehicle, same signal lights are used for right turn/left turn indication and failure/overtaking (or hazard) indication, i.e., the left/right directional signal control switches and the failure/overtaking signal control switch are connected in parallel to the signal lights. When the failure/overtaking signal control switch is pressed on, the signal lights are simultaneously flashed for failure/overtaking indication. When giving a left or right turn signal, the failure/overtaking signal control switch must be switched off before switching on the left or right turn signal control switch. If the failure/overtaking signal control switch is maintained switched on, the driver cannot control one signal light for left or right turn indication.

SUMMARY OF THE INVENTION

The present invention has been accomplished to provide a left/right turn, failure/overtaking vehicle signal light control system which eliminates the aforesaid problem. According to the present invention, the failure/overtaking signal control switch is automatically switched off when the motor vehicle driver switches on the left or right turn signal control switch to give a left or right turn signal. In one embodiment of the present invention, the left/right turn, failure/overtaking vehicle signal light control system comprises a holder frame, an actuating device pivoted to the holder frame and driven by a lever, two signal lights, first switch means controlled by the actuating device to flash one of the signal lights for left or right turn indication, second switch means controlled to flash the signal lights for failure/overtaking indication, and third switch means connected between the second switch means and the signal lights, wherein the actuating device is moved between a first position where the actuating device is maintained in contact with the third switch means, enabling the signal lights to be flashed for failure/overtaking indication when the second switch means is witched on, and a second position where the actuating device is disconnected from the third switch means, and the first switch means is driven by the actuating device to flash one of the signal lights for left or right turn indication.

BRIEF DESCRIPTION OF THE DRAWINGS

FIG. 7 is an exploded view of a left/right turn, failure/overtaking vehicle signal light control system according to a second embodiment of the present invention.

FIG. 8 is a sectional view of a part of FIG. 7, showing the movement of the actuating device with the directional signal control lever in the holder frame.

DETAILED DESCRIPTION OF THE PREFERRED EMBODIMENT

Figure 2:
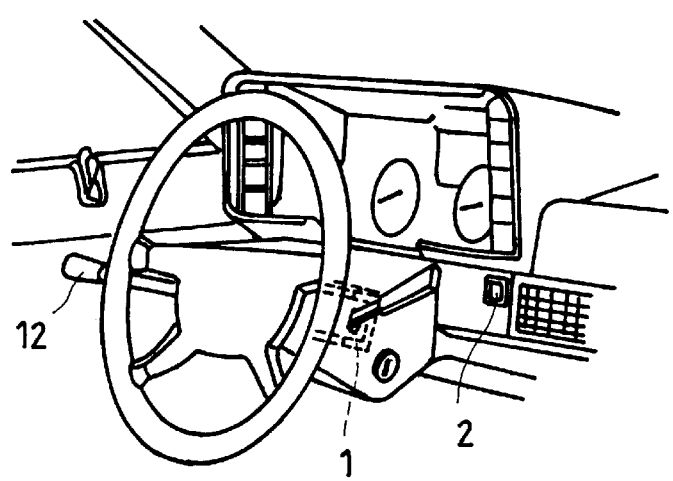
FIG. 2 is an applied view of the present invention, showing the left/right turn, failure/overtaking vehicle signal light control system installed in a vehicle.
Figure 1:
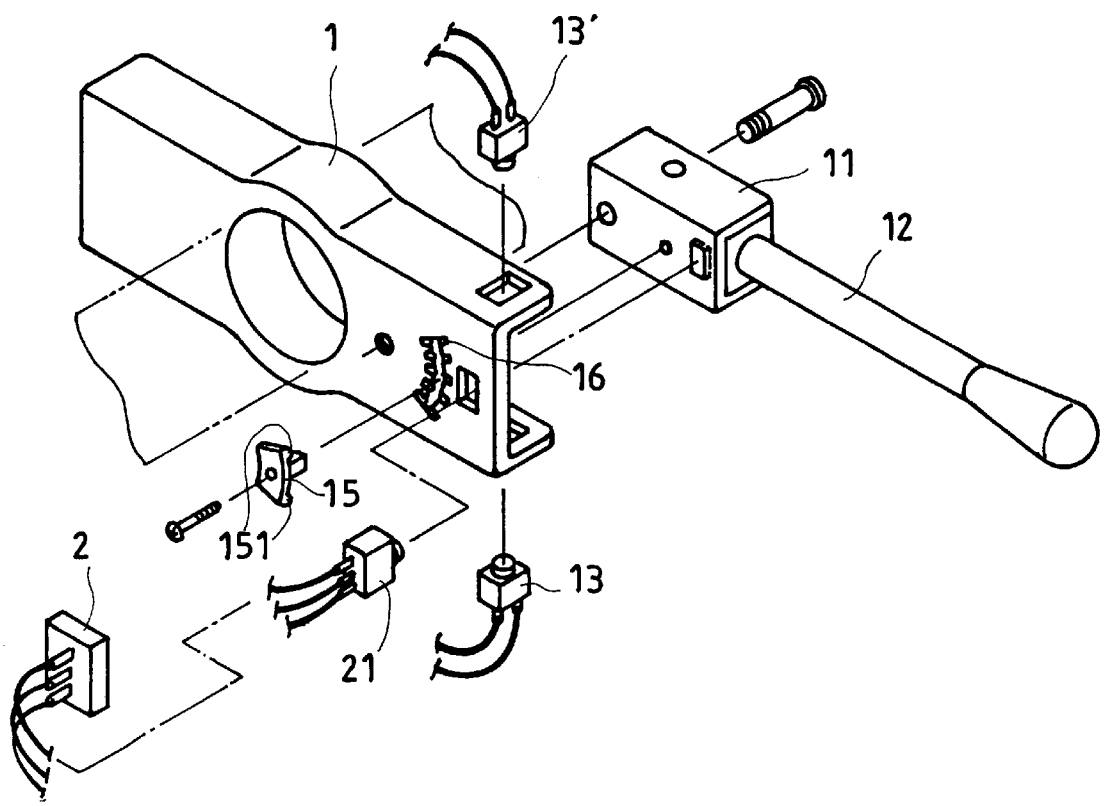
FIG. 1 is an exploded view of a left/right turn, failure/overtaking vehicle signal light control system according to one embodiment of the present invention.
Figure 3:
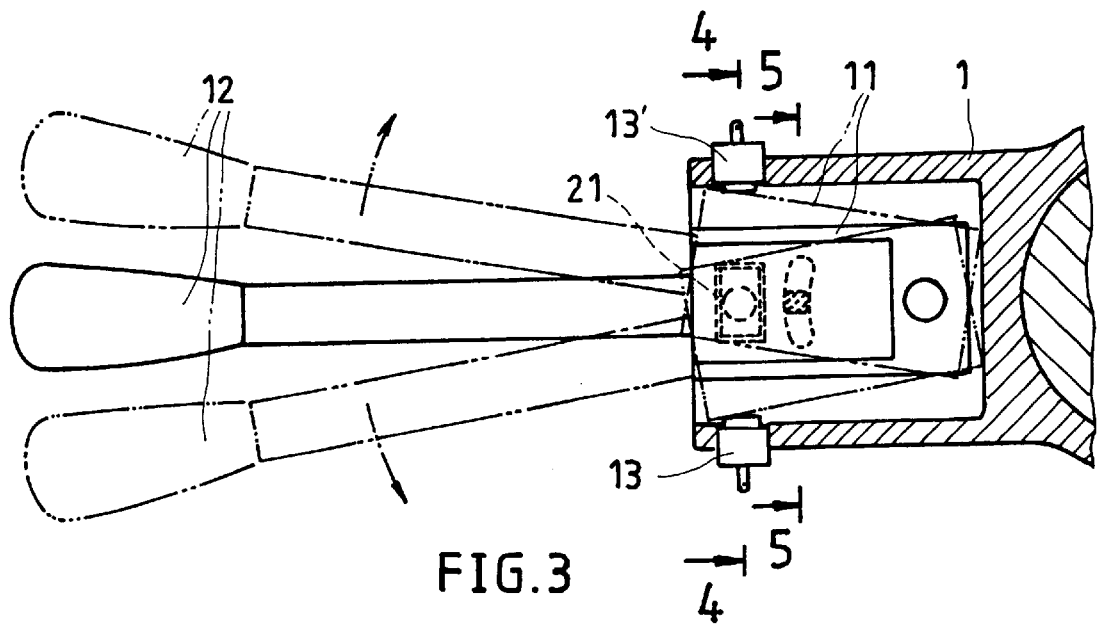
FIG. 3 is a schematic drawing showing the directional signal control lever shifted.
Figure 4:
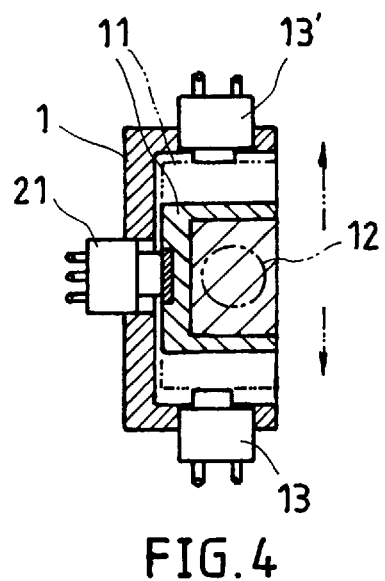
FIG. 4 is a sectional view of a part of the present invention, showing the movement of the actuating device in the holder frame.
Figure 5:
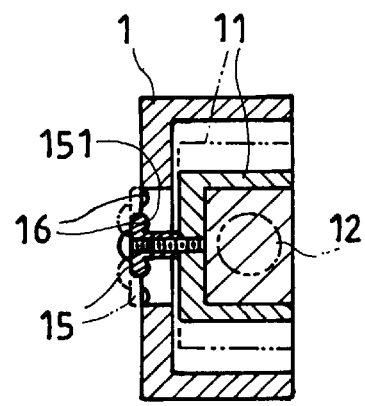
FIG. 5 is a schematic drawing showing the positioning of the positioning device in the locating holes at the holder frame according to the present invention.
Figure 6:
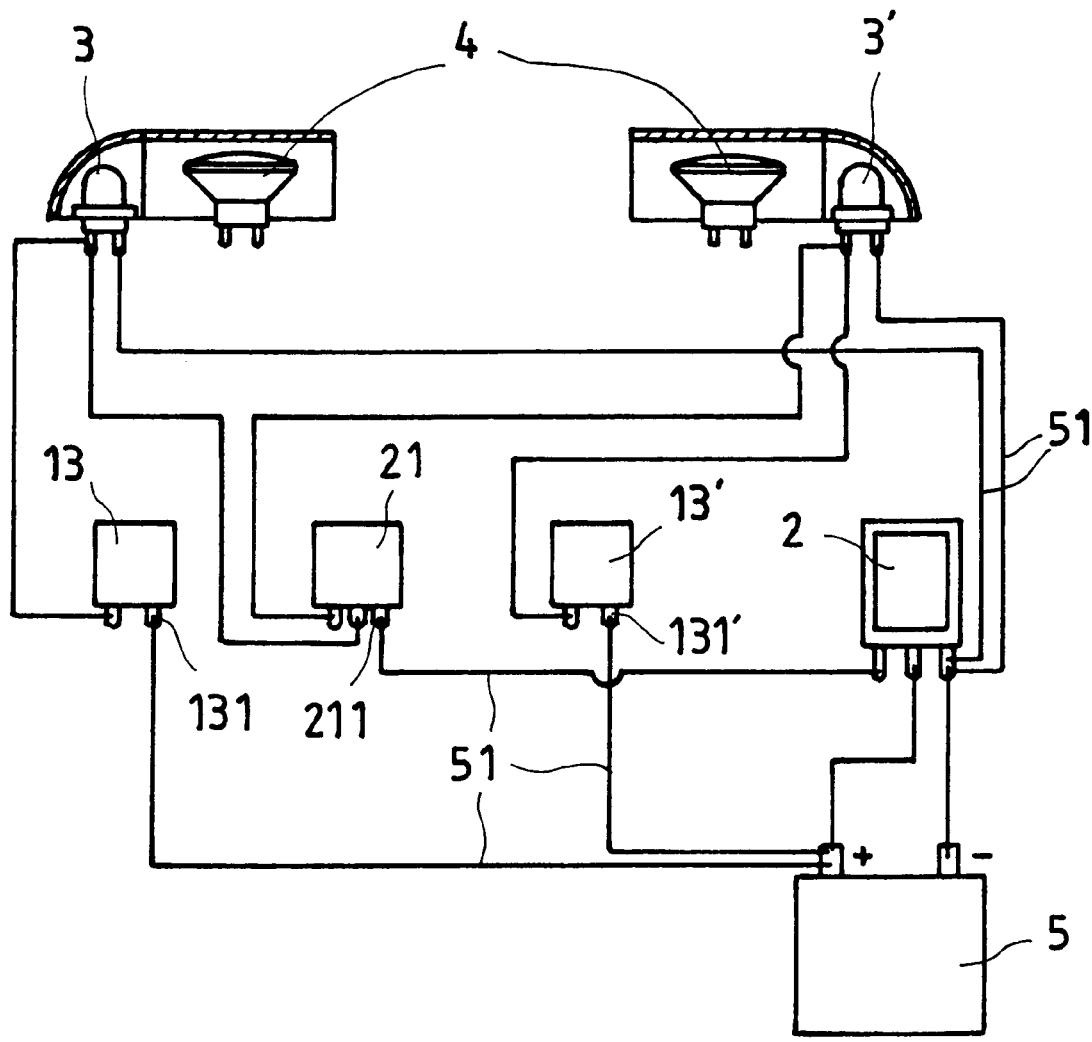
FIG. 6 is a circuit block diagram according to the present invention.

Referring to FIGS. from 1 through 6, a failure/overtaking signal light control switch 2 is connected to a battery 5. A contact switch 21 is connected to one terminal for example the negative terminal 51 of the battery 5. A directional signal control lever 12 is pivoted to a holder frame 1, and driven to move an actuating device 11, and to control signal lights 3 and 3'. The contact switch 21 is maintained depressed by the directional signal control lever 12 to connect battery power supply from the battery 5 to the failure/overtaking signal light control switch 2. When the switch 2 is pressed on, the signal lights 3 and 3' which are disposed at two opposite sides of the head lamps 4 of the motor vehicle are simultaneously turned on for failure/overtaking indication. When the directional signal control lever 12 is operated to disconnect the actuating device 11 from the contact switch 21, the power terminal 211 of the contact switch 21 is off, and the power terminal 131 or 131' of one directional signal light control switch 13 or 13' is switched on, thereby causing one signal light 3 or 3' to be flashed for left or right turn indication. A positioning device 15 is disposed outside the holder frame 1, having a springy locating rod 151 inserted through linked locating holes 16 at the holder frame 1 and connected to the actuating device 11. By shifting the springy locating rod 151 from one locating hole 16 to another, the actuating device 11 is set in one of a series of positions (see FIG. 5).

FIGS. 7 and 8 show an alternate form of the present invention. A contact circuit board 21' is mounted inside the holder frame, referenced by 1', and connected to the power circuit of the failure/overtaking signal light control switch 2. The contact circuit board 21' comprises a plurality of contacts 22' and 23'. A respective power line 24 is respectively connected to each pin at each of the contacts 22' and 23' at the contact circuit board 21'. A conductor plate 14 is mounted on the actuating device 11. When the actuating device 11 does no work, the conductor plate 14 is disposed in contact with the contacts 22' and 23' at the contact circuit board 21', therefore the failure/overtaking signal light control switch 2 is electrically connected. When the actuating device 11 is moved with the directional signal control lever 12 to contact the left or right directional signal light control switch 13 or 13', the conductor plate 14 is disconnected from the contacts 22' and 23' at the contact circuit board 21' to cut off power supply from the failure/overtaking signal light control switch 2, and therefore only one signal light 3 or 3' is flashed for left or right turn indication.

As indicated above, the present invention provides a vehicle signal light control system which uses switch means to control two signal lights for positive failure/overtaking indication as well as left/right turn indication.

What the invention claimed is:

1. A system for controlling turn and hazard indication light signals of a vehicle, comprising:

(a) a holder frame;

(b) an actuating device displaceably coupled to said holder frame for displacement between a first position and one of a pair of second positions, said actuating device including a conductor plate displaceable therewith;

(c) a pair of direction signal switch devices coupled to said holder frame for respectively activating a selected turn indication light signal of the vehicle responsive to said actuating device being displaced to a corresponding one of said pair of second positions;

(d) an independently actuable hazard signal switch device for activating the hazard indication light signal of the vehicle; and, (e) a contact switch device coupled to said holder frame and having a plurality of contacts contacted by said conductor plate when said actuating device is in said first position, said hazard signal switch device being electrically coupled to said plurality of contacts to selectively enable and disable a power connection to said hazard signal switch device, said contact switch device being enabled to couple power to said hazard signal switch device responsive to said actuating device being in said first position, said conductor plate being displaced from contact with said plurality of contacts responsive to said actuating device being displaced to one of said pair of second positions for activating a selected turn indication light signal and interrupting power to hazard signal switch device;

whereby activation of the selected turn indication light signal interrupts activation of the hazard indication light signal.

* * * * *